UNITED STATES PATENT OFFICE.

CYPRIEN MARIE TESSIÉ DU MOTAY, OF PARIS, FRANCE.

IMPROVED PROCESS OF EXTRACTING SILVER AND GOLD FROM ARSENIO-SULPHURETS OF LEAD, COPPER, &c.

Specification forming part of Letters Patent No. 103,433, dated May 24, 1870.

*To all whom it may concern:*

Be it known that I, CYPRIEN MARIE TESSIÉ DU MOTAY, of Paris, in the Empire of France, have invented an Improved Docimastic Process and Method of the Treatment of the Simple Sulphurets, the Complex Sulphurets, and the Arsenious Sulphurets of Lead, Antimony, Copper, and Iron, as well as coppery mats and coppers containing precious metals, in order to extract silver and gold therefrom; and I do hereby declare the following to be a full and exact description of the same.

This new or improved docimastic process and methods of treating the simple sulphurets, the complex sulphurets, and the arsenio-sulphurets of lead, antimony, copper, and iron, as well as coppery mats and coppers containing precious metals, in order to extract silver and gold therefrom, consists, first, in roasting the simple or complex sulphurets, the antimonio-sulphurets, and the arsenio-sulphurets containing silver or gold, in the presence of pure silicates of auriferous quartz or earthy and metallic silicates, adding, in order to complete this roasting and to expel all the sulphur contained in the minerals, either lead, which is intended to form oxide of lead, or litharge or minium, or any other metallic oxide capable of producing, in contact with air or oxidizing flames, peroxides or silicates of peroxides; secondly, in thus transforming into the state of very fusible basic silicates the oxides of the desulphureted metals; thirdly, in melting or running in the melted state the silicates of this kind produced upon a mat of lead also melted, and in stirring or agitating them, either by paddles held in the hand, or by mechanical means, or by means of gases mechanically employed up to the moment when the gold and silver are entirely dissolved in the melted lead; fourthly, in separating the poor scoria deprived of the precious metals of the lead, which has taken them up, and in stirring or agitating upon the same mass of lead a fresh quantity of rich scoria; fifthly, in repeating this liquation an indefinite number of times until the moment when the capacity of saturation of the lead for the precious metals, which is lessened by each operation, no longer permits the continuance of this mode of treatment; sixthly, in testing the lead saturated with silver or gold by the methods of cupellation now in use in order to extract therefrom the precious metals; seventhly, in removing from the poor scoria the oxides of lead, antimony, and copper, which, for the most part, are contained therein, by bringing back these oxides to the metallic state by the separate or united action of charcoal and iron; eighthly, in separating by the special methods presently described the copper and antimony from the lead with which they are united; ninthly, in re-employing, either wholly or partly, the purified lead in the treatment, by oxidation and silication, of fresh quantities of mineral; tenthly, in reducing, either in reverbatory or cupola furnaces, or in all other melting-furnaces, the basic silicates enumerated above by the action of charcoal or iron, when the latter are the produce of minerals containing copper pyrites in considerable quantities.

The metallic matter thus obtained consists of an alloy of copper, lead, silver, and gold, or of copper, lead, antimony, silver, and gold, free from sulphur, which may be all treated at once, either by docimastic methods in countries rich in combustibles, or by the humid process in countries where mineral acids are low in price.

Having thus stated in a general manner my docimastic methods of treating sulphureted, antimonio-sulphureted, and arsenio-sulphureted minerals containing precious metals, I proceed specially to describe the new operations and reactions whereby they are essentially distinguished from those at present employed for the same object.

These operations and reactions consist, in the first place, of the roasting, the oxidation, and the scorification of the simple or complex sulphurets of antimonio-sulphurets and of arsenio-sulphurets in the presence of silica and oxides of lead, or of all other metallic oxides capable of passing into the state of peroxides or of silicates of peroxides in the oxidizing flames, in order, first, to prevent the formation of the oxysulphurets of lead, antimony, and copper, which, in dissolving with the silver or gold in the lead, cause afterward the loss, during the cupellation, of an appreciable quantity of the precious metals, which are dissolved in this lead, and render inapplicable for industrial purposes either the cupellated litharges or the lead proceeding by reduction from the said litharges; secondly, to permit the complete dissolution in the lead of the silver and gold contained in the basic silicates free from sulphur, without the antimony or copper which have passed from the state of sulphurets into the state of silicates being able to dissolve in the lead, and consequently to injure it; thirdly, to obtain as the final result from a series of successive liquations a testable (cupellable) lead, rich in precious metals; fourthly, to avoid a great number cupellations to obtain pure litharges transformable into lead of an equal purity, and to thus diminish the net cost of the industrial extraction of silver and gold, by means of the cupel, to a considerable extent.

The operations and reactions, in the second place, consist in the reduction to pure lead, or into an alloy of lead and antimony, of lead and copper, or of lead of antimony, and copper of the scoria deprived of gold or silver, in order, first, if the extracted lead is pure, to make it again serve by way of roasting for the oxidation of a fresh quantity of sulphureted, arsenio-sulphureted, or antimonio-sulphureted minerals; secondly, if the lead is alloyed with antimony or copper, or with both these metals, to separate it from one of these metals or both together, in order, also, to use it again after purification for the oxidation of a fresh quantity of sulphureted, arsenio-sulphureted, or antimonio-sulphureted minerals.

The method for separating the lead from the antimony, or from the antimony and copper united, constitutes one of the greatest novelties and one of the most essential parts of this invention. I therefore proceed to describe separately the reactions peculiar to the separation of the metals contained in the above-mentioned alloys. Taking, for example, an alloy of lead of antimony, the inventor submits it, after having melted it in a reverberatory furnace or a cupola-furnace, to the action of the nascent steam produced by aerohydric or oxyhydric blow-pipes, fed by a mixture in definite proportions of air, or of oxygen and pure hydrogen, or carbonated hydrogen. The flame produced by these blow-pipes should be as free as possible from any trace of uncombined oxygen. It is even preferred, in order to prevent any oxidation of the lead, that the flame should contain a little hydrogen or free carbon.

The nascent steam may perhaps be mixed with the ordinary steam generated at 212° Fahrenheit. The antimony, which decomposes water at a high temperature, oxidizes in passing into the state of antimoniate of oxide of antimony, one portion of which volatilizes, while the other remains attached to the inner sides of the reverberatory or other furnace in this operation, during which almost the whole of the antimony is separated, and the lead, which does not decompose water, is but little, or not at all, oxidized, but still retains traces of antimony with a strong affinitive force, and, in order to entirely purge it from this crystal, it is necessary to have recourse to sulphate of lead.

This new reactive has the property of becoming decomposed in oxide of lead in free oxygen, and in sulphurous acid by antimony, which, by this decomposition taking up the oxygen set at liberty, oxidifies and combines with the oxide of lead of the decomposed sulphate. The lead is then completely purified and rendered applicable for all industrial purposes.

It follows, as a matter of course, that the sulphate of lead can by itself, without the previous employment of steam in the nascent state, separate the whole of the antimony contained in an alloy of this metal with the lead; but in many cases to employ it would cost too much.

Terreous hydrates, such as hydrates of lime and baryta, can also be effectually employed instead of steam in a nascent state, or ordinary steam from water, in order to oxidize the antimony and to separate it from the lead; but the inventor prefers the steam generated by aerohydric or oxyhydric blow-pipes, which furnish at the same time the heat necessary for the fusion of the alloys and the reactive, which partly or wholly removes from the lead the antimony which injures it.

When the lead is alloyed with copper, and this alloy does not contain antimony, I melt it with a quantity of sulphuret of lead rather more than equivalent to the quantity of copper, to transform into sulphuret. This fusion is conducted away from any oxidizing action in a reducing medium, and produces an immediate reaction by way of double exchange.

The sulphur combined with the lead acts upon the copper of the alloy, and thus substitutes metallic lead for the copper, which scorifies and passes into the state of sulphuret. The lead thus deprived of copper is pure and proper to be employed as indicated above, either for the oxidization of fresh mineral, or it may be sold for general purposes.

Alkaline and alkaline terreous, bisulphurets, and polysulphurets, as well as metallic sesquisulphurets and bisulphurets, may be substituted for the sulphuret of lead, in order to remove the copper from the lead by causing the latter metal to pass into the state of sulphuret. The sulphuret of copper may, after roasting, be transformed into metallic copper by the reducing processes at present employed.

When antimonio-sulphureted argentiferous leads have been previously brought to the metallic state by the method of reduction at present employed, the inventor submits them to the action of the same blow-pipes; and when the antimony which has passed into the state of oxide has been separated from the lead, in which the silver remains entirely dissolved, this lead is tested or cupellated, and the precious metal extracted therefrom.

The chief points of novelty in this invention may be stated as follows:

1. The method of roasting and the silicatisation of the metallic, simple, or complex sulphurets, arsenio-sulphuret, and antimonio-sulphurets containing silver or gold by means of the processes above described.

2. The method of liquation and fusion by successive series of argentiferous and auriferous silicates upon one same bath of lead, which deargentises and deaurifies them, by which method the same object is obtained by one cupellation, which, according to the best methods at present in use, requires several.

3. The methods by which, after the oxides of lead, antimony, or copper contained in the silicates deprived of silver and gold have been brought back to the metallic state, the lead is separated from the copper with which it is united by the addition of an equivalent quantity of sulphuret of lead, or of one of the sulphurets enumerated above, and the antimony by the action of the aerohydric or oxyhydric blow-pipes combined with the reaction produced by a small amount of sulphuret of lead.

4. The application of the above-described methods to the entire or partial treatment of copper mats and argentiferous and auriferous coppers of the minerals of antimoniferous lead and of the mineral of antimony containing silver and lead or pure silver.

In testimony whereof I have signed my name to this specification before two subscribing witnesses.

C. M. TESSIÉ DU MOTAY.

Witnesses:
P. GUÉROULT,
C. LAFOND.